United States Patent [19]

Shimizu et al.

[11] 4,049,899

[45] Sept. 20, 1977

[54] APPARATUS FOR UNIFORMLY HEATING MOLTEN GLASS

[75] Inventors: Hiroshi Shimizu, Moriyama; Jun Nishidai, Kyoto; Toru Yasuta, Kusatsu, all of Japan

[73] Assignee: Nippon Electric Glass Company, Limited, Shiga, Japan

[21] Appl. No.: 695,644

[22] Filed: June 14, 1976

[30] Foreign Application Priority Data

June 17, 1975 Japan .................................. 50-72698

[51] Int. Cl.2 ................................................ C03B 5/02

[52] U.S. Cl. ........................................................ 13/6

[58] Field of Search ....................................... 13/6, 23

[56] References Cited

U.S. PATENT DOCUMENTS

| | | | |
|---|---|---|---|
| 3,182,112 | 5/1965 | Torok | 13/6 |
| 3,395,237 | 7/1968 | Orton | 13/6 |
| 3,836,689 | 9/1974 | Holler et al. | 13/6 |
| 3,984,612 | 10/1976 | Susser et al. | 13/23 X |
| 3,985,944 | 10/1976 | Maddux | 13/6 |

*Primary Examiner*—R. N. Envall, Jr.
*Attorney, Agent, or Firm*—Kurt Kelman

[57] ABSTRACT

Molten glass is uniformly heated between a plurality of pairs of electrodes which receive electric current from a current source which includes a like plurality of transformers and a source of electric power, the primary windings of the transformers being connected in series to the power source and each secondary transformer winding being connected to an associated pair of electrodes. The transformers feed and control the electric current to equalize the current regardless of electrical resistance variations in the material due to rising temperatures.

3 Claims, 1 Drawing Figure

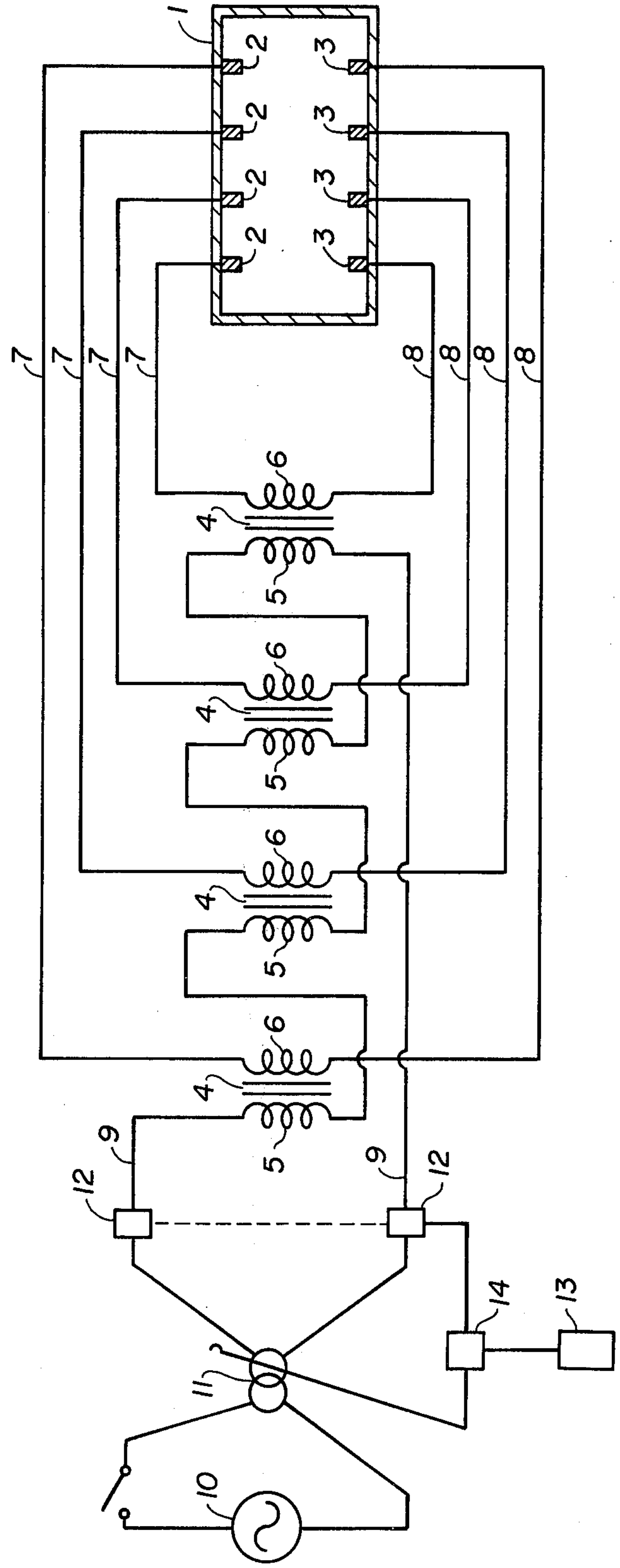
1
2
3
2
3
2
3
2
3
7
7
7
7
8
8
8
8
6
4
5
6
4
5
6
4
5
6
4
5
9
12
9
12
14
13
11
10

APPARATUS FOR UNIFORMLY HEATING MOLTEN GLASS

The present invention relates to improvements in apparatus for heating a material having an electrical resistance decreasing with an increase in the temperature of the material, i.e. a material with a negative temperature co-efficient of resistivity, such as molten glass.

It has been proposed to melt glass in an apparatus comprising a container for the glass, such as a closed tank, a plurality of pairs of associated electrodes mounted in the container and immersed in the molten glass for passing an electric current between the electrodes of each pair and through the material in the container, and a source of the electric current connected to each pair of electrodes.

Due to the fact that the electrical resistance of glass decreases with an increase in its temperature, a constant voltage maintained between the electrodes in such an apparatus will elevate the temperature in the glass incrementally as it reduces the electrical resistance of the glass, thus increasing the current flowing through the glass. This disadvantageously affects the uniformity of the heating. Once the temperature of the glass between the pairs of electrodes is elevated, the glass will be subjected to further and rapid temperature rise so that uniform heating of the entire glass mass cannot be achieved.

On the other hand, if a constant current source is used, the current flowing between the electrodes will be maintained constant even when the temperature of the material rises but the heat will be reduced corresponding to the reduction in the electrical resistance. Thus, an elevation of the temperature of the material is prevented and, in some cases, the temperature may even drop. Therefore, uniform heating can be achieved.

However, generally speaking, electric power sources are of the constant voltage type and, therefore, certain measures must be taken to use such an electric power source as a constant current source.

Accordingly to one known method, this has been accomplished by connecting a large impedance in series with, and between, the constant voltage electric power source and the load, i.e. the pairs of electrodes, so as to make resistance variations due to the elevation in the temperature of the material far less effective and thus substantially to prevent current variations due to electrical resistance variations. This requires a large power source because the power is largely consumed by the impedance. This is very uneconomical in view of the power loss. According to another proposal, an electric power control element is connected in series with the load to maintain the circuit current constant by controlling the element. This requires a complicated and, therefore, expensive control circuit.

According to Japanese patent publication No. 13,317/67, these disadvantages are overcome in an apparatus for uniformly heating a material having an electrical resistance decreasing with an increase in the temperature of the material by arranging a transformer between the electric power source and each pair of associated electrodes, the primary windings of each transformer being connected between the power source and each pair of electrodes, and the secondary windings of the transformers being connected to each other in series. In such an apparatus, even if the temperature of the material between a pair of electrodes is elevated to cause an increase in the current flowing through the material between the electrodes, the primary current connected to the pair of electrodes is reduced because the secondary windings of all transformers are connected in series to form a closed loop, thus making the secondary currents of all transformers equal. Thus, the currents flowing through all pairs of electrodes are equalized so that uniform heating of the entire mass of material is achieved.

While this apparatus avoids the large power losses or complicated controls of the first-described methods, it has the disadvantage of requiring twice as many transformers as electrode pairs, which makes the apparatus large in volume. Moreover, since the current equalization is to eliminate the current unbalance caused by localized temperature increases, the entire voltage capacity must be increased to obtain complete (100%) correction. Furthermore, the transformers connected to the respective pairs of electrodes function only to correct current unbalances and, therefore, another transformer is required to function as a current source between the electric power source and the current unbalance correcting transformers.

It is the primary object of this invention to provide an efficient and relatively simple apparatus for reliably heating a material having an electrical resistance decreasing with an increase in the temperature of the material in a uniform manner.

It is another object of the invention to provide such an apparatus in a compact arrangement, which may be a unit assembly with any desired number of pairs of heating electrodes.

The above and other objects and advantages are accomplished in accordance with the present invention in an apparatus of the first-described type with a current source which includes a plurality of transformers each having a primary winding and a secondary winding, and a source of electric power, the primary windings being connected in series to the electric power source and each of the secondary windings being connected to an associated one of the pairs of electrodes whereby the transformers feed and control the electric current delivered to the pairs of electrodes to equalize the current regardless of electrical resistance variations in the material between the electrodes.

The above and other objects, advantages and features of this invention will become more apparent from the following detailed description of a now preferred embodiment thereof, taken in conjunction with the single FIGURE of the accompanying drawing showing a diagram of the apparatus.

Electric heating furnace 1 contains a material having an electrical resistance decreasing with an increase in the temperature of the material, i.e. a material with a negative temperature co-efficient of resistivity, such as molten glass. Four pairs of associated heating electrodes 2, 3 are mounted in container 1 for passing an electric current between the electrodes of each pair and through the material in the furnace. As shown, the pairs of electrodes are spaced along the side walls of the furnace which are made of an electrically insulating material.

Four transformers with cores 4 are shown to have their secondary windings 6 connected by secondary circuit lines 7 and 8 to respective electrodes 2 and 3 of respective pairs of electrodes. The secondary circuit of each transformer thus consists of winding 6, electric conductor lines 7 and 8, electrodes 2 and 3 of the associated pair of electrodes and the material, i.e. molten glass, between the pair of electrodes, and forms an independent closed loop.

Primary windings 5 of all the transformers are connected in series with one another and to a.c. power source 10 by common primary circuit line 9.

In the illustrated embodiment, voltage regulator 11 and voltage and current detector 12 are connected in series between primary windings 5 and electric power source 10, rather than the power source being connected directly to the primary windings. Detector 12 detects the monitors the instant current and power fed to the electrodes. The voltage regulator is so controlled by control element 14 that the power monitored by detector 12 may be maintained equal to a value preset by power selector 13 for selectively setting a power for a desired heat. In this manner, the temperature of the entire material, i.e. mass of molten glass, in container 1 is maintained at a desired and uniform temperature. Since the material in the container is directly heated by the current flowing through the secondary transformer circuit, the secondary currents of all transformers have a common value, the current flowing between all pairs of electrodes 2, 3 is equal and the heating of the entire material in the container is uniform. All the transformers being alike, the secondary currents all have the same value because the primary windings of the transformers are connected in series and the same primary current flows therethrough.

If the material is partially or locally subjected to a temperature variation, the local temperature unbalance is removed because the secondary currents of all transformers are always maintained equal to each other. When the temperature of the material is locally elevated, the electrical resistance of this local material portion is correspondingly reduced, lowering the impedance of the secondary circuit passing through this portion so that the current flowing therethrough would be increased. As above described, however, since all the primary windings 5 are connected in series and with a constant voltage source, the primary currents of all transformers have the same value. The current value is the ratio between the constant voltage of the electric power source and the total of the primary input impedances of the respective transformers. Therefore, if the secondary impedance of one of the transformers is reduced, as above described, the primary impedance of the one transformer is also lowered. Accordingly, the primary currents of all transformers are increased so that the secondary currents of all transformers are increased. The currents flowing between respective pairs of electrodes are maintained equal. Therefore, if the material is subjected to a local portion of the material where the temperature has risen and the electrical resistance has decreased correspondingly, and the consumed power is increased at the other portions. Thus, the normal condition, i.e. uniform heating, is restored.

The variation of the primary input impedance of a transformer, due to the variation in the electrical resistance of a local portion of the material whose temperature changes, is so small in comparison with the total of the primary input impedances of all transformers that actual current variations are quite small. Therefore, even when such local temperature changes occur, the total power fed to furnace 1 from power source 10 is maintained almost constant. The total power or current fed to the furnace is maintained absolutely constant by monitoring the instant power feed by detector 12 and comprising this with the value preset by power selector 13 at the input control 14. Input control 14 controls the voltage regulator 11 so that the power fed to the furnace is maintained constant.

Since each pair of electrodes 2, 3 is connected to a respective transformer and the transformers are interconnected only by the series connection of their primary windings, each transformer and associated pair of electrodes may be assembled into a unit. Any number of such units may then be readily assembled according to the capacity of the furnace.

What is claimed is:

1. An apparatus for uniformly heating a material having an electrical resistance decreasing with an increase in the temperature of the material, which comprises 1. a container for the material,
2. a plurality of pairs of associated electrodes mounted in the container for passing an electric current between the electrodes of each pair and through the material in the container, and
3. a source of the electric current connected to each pair of electrodes, the current source including
   a. a like plurality of transformers each having a primary winding and a secondary winding, and
   b. a source of electric power, the primary windings being connected in series to the electric power source and each of the secondary windings being connected to an associated one of the pairs of electrodes whereby the transformers feed and control the electric current delivered to the pairs of electrodes to equalize the current regardless of electrical resistance variations in the material between the electrodes.

2. The apparatus of claim 1, further comprising a voltage regulator and a voltage and current detector connected in series between the primary windings and the electric power source.

3. The apparatus of claim 1, further comprising a power selector connected in series between the primary windings and the electric power source.

* * * * *